United States Patent
Kang

(10) Patent No.: US 9,246,976 B2
(45) Date of Patent: Jan. 26, 2016

(54) METHOD AND APPARATUS FOR CONTROLLING HTTP SOCKETS

(71) Applicant: Samsung Electronics Co. Ltd., Suwon-si, Gyeonggi-do (KR)

(72) Inventor: Kiseok Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 13/747,935

(22) Filed: Jan. 23, 2013

(65) Prior Publication Data

US 2013/0191525 A1     Jul. 25, 2013

(30) Foreign Application Priority Data

Jan. 25, 2012    (KR) .......................... 10-2012-0007135

(51) Int. Cl.
*H04L 29/08*     (2006.01)
*H04L 29/06*     (2006.01)

(52) U.S. Cl.
CPC .............. *H04L 67/02* (2013.01); *H04L 69/162* (2013.01)

(58) Field of Classification Search
CPC ......... G06F 11/00; G06F 11/36; G06F 11/08; H04L 43/0811; H04L 67/02; H04L 69/162
USPC .......... 709/223–224, 206, 219, 203; 726/206; 370/252
See application file for complete search history.

(56) References Cited

U.S. PATENT DOCUMENTS

| | | | |
|---|---|---|---|
| 2009/0077233 A1* | 3/2009 | Kurebayashi et al. | 709/224 |
| 2010/0011414 A1* | 1/2010 | Banerjee et al. | 726/3 |
| 2010/0088423 A1* | 4/2010 | Mazzagatte et al. | 709/229 |
| 2010/0281118 A1* | 11/2010 | Donahue et al. | 709/206 |
| 2011/0202631 A1* | 8/2011 | Berna Fornies et al. | 709/219 |
| 2012/0051236 A1* | 3/2012 | Hegde et al. | 370/252 |

* cited by examiner

*Primary Examiner* — Kim T Nguyen
(74) *Attorney, Agent, or Firm* — Jefferson IP Law, LLP

(57) ABSTRACT

A method and apparatus for controlling HTTP sockets in a client device are provided. The HTTP socket control method for a client device includes finding, when an HTTP request is issued, a suitable socket in a socket pool containing at least one socket for each of a plurality of destination IP groups, sending the HTTP request to a server through the found suitable socket, and updating, when a response for the request is received from the server, socket information of the found socket in the socket pool.

16 Claims, 15 Drawing Sheets

FIG. 4A

```
Precondition:
HTTP request Destination: 1.1.1.1:80
Current System tick: 20000

Persistent Socket 1 : dest IP(1.1.1.1), Port(80),  Last Used tick: 14000, max: 5,    timeout:9s,  Remaining Time: 3s.
Persistent Socket 2 : dest IP(1.1.1.1), Port(80),  Last Used tick: 16000, max: none, timeout:10s, Remaining Time: 6s.
Persistent Socket 3 : dest IP(1.1.1.1), Port(80),  Last Used tick: 19000, max: none, timeout:12s, Remaining Time: 11s.
Persistent Socket 4 : dest IP(1.1.1.1), Port(443), Last Used tick: 12000, max: none, timeout:14s, Remaining Time: 6s.
Persistent Socket 5 : dest IP(1.1.1.1), Port(80),  Last Used tick: 17000, max: 6,    timeout:10s, Remaining Time: 7s.
Persistent Socket 6 : dest IP(1.1.1.1), Port(443), Last Used tick: 15000, max: none, timeout:10s, Remaining Time: 5s.
```

FIG. 4B

```
Persistent Socket 1 : dest IP(1.1.1.1), Port(80),  Last Used tick: 20000, max: 4, timeout:9s,  Remaining Time: 9s.
Persistent Socket 2 : dest IP(1.1.1.1), Port(80),  Last Used tick: 16000, max: none, timeout:10s, Remaining Time: 6s.
Persistent Socket 3 : dest IP(1.1.1.1), Port(80),  Last Used tick: 19000, max: none, timeout:12s, Remaining Time: 11s.
Persistent Socket 4 : dest IP(1.1.1.1), Port(443), Last Used tick: 12000, max: none, timeout:14s, Remaining Time: 6s.
Persistent Socket 5 : dest IP(1.1.1.1), Port(80),  Last Used tick: 17000, max: 6, timeout:10s, Remaining Time: 7s.
Persistent Socket 6 : dest IP(1.1.1.1), Port(443), Last Used tick: 15000, max: none, timeout:10s, Remaining Time: 5s.
```

FIG. 6A

```
Precondition:
Current System tick: 20000
Persistent Socket 1 : dest IP(1.1.1.1), Port(80), Last Used tick: 14000, max: none, timeout:7s,   Remaining Time: 2s.
Persistent Socket 2 : dest IP(1.1.1.1), Port(80), Last Used tick: 16000, max: none, timeout:10s, Remaining Time: 6s.
Persistent Socket 3 : dest IP(1.1.1.1), Port(80), Last Used tick: 19000, max: none, timeout:12s, Remaining Time: 11s.
Persistent Socket 4 : dest IP(1.1.1.1), Port(80), Last Used tick: 12000, max: none, timeout:10s, Remaining Time: 3s.
Persistent Socket 5 : dest IP(1.1.1.1), Port(80), Last Used tick: 13000, max: none, timeout:10s, Remaining Time: 3s.
Persistent Socket 6 : dest IP(1.1.1.1), Port(80), Last Used tick: 13000, max: none, timeout:10s, Remaining Time: 3s.
```

FIG. 6B

```
Persistent Socket 2 : dest IP(1.1.1.1), Port(80), Last Used tick: 16000, max: none, timeout:10s, Remaining Time: 6s.
Persistent Socket 3 : dest IP(1.1.1.1), Port(80), Last Used tick: 19000, max: none, timeout:12s, Remaining Time: 11s.
Persistent Socket 4 : dest IP(1.1.1.1), Port(80), Last Used tick: 20000,max: none, timeout:10s, Remaining Time: 10s.
Persistent Socket 5 : dest IP(1.1.1.1), Port(80), Last Used tick: 20000,max: none, timeout:10s, Remaining Time: 10s.
Persistent Socket 6 : dest IP(1.1.1.1), Port(80), Last Used tick: 20000,max: none, timeout:10s, Remaining Time: 10s.
```

FIG. 8A

```
Precondition:
Current System tick: 20000
Response Header information.
    Connection: Keep-Alive
    Keep-Alive: timeout=6

Persistent Socket 1 : dest IP(1.1.1.1), Port(80), Last Used tick: 14000, max: none, timeout:13s, Remaining Time: 7s.
Persistent Socket 2 : dest IP(1.1.1.1), Port(80), Last Used tick: 16000, max: none, timeout:10s, Remaining Time: 6s.
Persistent Socket 3 : dest IP(1.1.1.1), Port(80), Last Used tick: 12000, max: none, timeout:10s, Remaining Time: 2s.
Persistent Socket 4 : dest IP(1.1.1.1), Port(80), Last Used tick: 13000, max: none, timeout:10s, Remaining Time: 3s.
Persistent Socket 5 : dest IP(1.1.1.1), Port(80), Last Used tick: 13000, max: none, timeout:10s, Remaining Time: 3s.
```

FIG. 8B

```
Persistent Socket 1 : dest IP(1.1.1.1), Port(80), Last Used tick: 14000, max: none, timeout:13s, Remaining Time: 7s.
Persistent Socket 2 : dest IP(1.1.1.1), Port(80), Last Used tick: 16000, max: none, timeout:10s, Remaining Time: 6s.
Persistent Socket 4 : dest IP(1.1.1.1), Port(80), Last Used tick: 20000, max: none, timeout:10s, Remaining Time: 10s.
Persistent Socket 5 : dest IP(1.1.1.1), Port(80), Last Used tick: 20000, max: none, timeout:10s, Remaining Time: 10s.
Persistent Socket 6 : dest IP( 1.1.1.1), Port (80), Last Used tick: 20000, max: none, timeout: 6s, Remaining Time: 6s.
```

FIG. 10A

```
Precondition:
Response Header information.
            Connection: Keep-Alive
            Keep-Alive: timeout=6
            Content-Length: 120

Ping data : dest IP(1.1.1.1), Port(80), Request Data: ,,,,,,, , Content-Length: 360
Ping data : dest IP(1.1.1.2), Port(80), Request Data: ,,,,,,, , Content-Length: 240
...
Ping data : dest IP(1.1.1.n), Port(80), Request Data: ,,,,,,, , Content-Length: 200
```

FIG. 10B

```
Ping data : dest IP(1.1.1.1), Port(80), Request Data: ,,,,,,, , Content-Length: 120
Ping data : dest IP(1.1.1.2), Port(80), Request Data: ,,,,,,, , Content-Length: 240
...
Ping data : dest IP(1.1.1.n), Port(80), Request Data: ,,,,,,, , Content-Length: 200
```

METHOD AND APPARATUS FOR CONTROLLING HTTP SOCKETS

PRIORITY

This application claims the benefit under 35 U.S.C. §119 (a) of a Korean patent application filed on Jan. 25, 2012 in the Korean Intellectual Property Office and assigned Serial No. 10-2012-0007135, the entire disclosure of which is hereby incorporated by reference.

BACKGROUND OF THE INVENTION

1. Field of the Invention

The present invention relates to a method and apparatus for controlling HTTP (Hypertext Transfer Protocol) sockets. More particularly, the present invention relates to a method and apparatus for controlling persistent HTTP sockets.

2. Description of the Related Art

HTTP (Hypertext Transfer Protocol) is a communication protocol to transfer text-based information between a web server on the Internet and a web browser of a user. HTTP is the primary data communication protocol for the World Wide Web. In HTTP 1.1, all connections are considered persistent by default.

In HTTP, persistent sockets may be managed in the following ways. In the usage aspect, an unused persistent socket with the intended destination is readily used. In the maintenance aspect, persistent sockets may be handled differently according to platforms. For example, in SHP platform and Apple platform, the client maintains an unused socket in the socket pool until the server closes the socket. In Android platform, the client forcibly closes a persistent socket whose default time has expired.

Existing schemes for managing persistent sockets may have the following problems. Among a pool of persistent sockets, an empty socket is selected for utilization. However, the persistent socket pool may include a socket that is inefficiently managed, a socket that is connected but not usable, a socket that will be broken during use owing to socket options or default timeout. Use of such a socket may cause an error during page loading.

In addition, it may be difficult to efficiently manage persistent sockets. That is, reloading of the same page or loading of a connected sub-page may require creation of an additional socket. Socket creation may cause network delay and increase page loading time, thus having a negative effect on user experience.

SUMMARY OF THE INVENTION

Aspects of the present invention are to address at least the above-mentioned problems and/or disadvantages and to provide at least the advantages described below. Accordingly, an aspect of the present invention is to provide a method and apparatus that can manage persistent sockets in such a way as to reduce error rate and increase transmission speed in HTTP.

In consideration that a web page is composed of many HTTP requests and successful rendering of the web page requires orderly reception and processing of responses corresponding to the requests, another aspect of the present invention is to provide a method and apparatus that can contribute to accurate rendering of a web page by managing HTTP requests so that each HTTP request is successfully processed without error.

Another aspect of the present invention is to provide a method and apparatus that can manage persistent sockets in such a way as to enhance socket reuse and communication speed.

In accordance with an exemplary embodiment of the present invention, a client device is provided. The client device includes a communication unit communicating with a server, a storage unit storing a socket pool containing at least one socket for each of a plurality of destination IP groups, and a control unit selecting, when an HTTP request is issued, a suitable socket in the socket pool, sending the HTTP request to the server through the selected suitable socket, and examining sockets in the socket pool to update socket information.

In accordance with another exemplary embodiment of the present invention, an HTTP socket control method for a client device is provided. The HTTP socket control method includes finding, when an HTTP request is issued, a suitable socket in a socket pool containing at least one socket for each one of a plurality of destination IP groups, sending the HTTP request to a server through the found suitable socket, and updating, when a response for the HTTP request is received from the server, socket information of the found suitable socket and other information in the socket pool.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A and 4B illustrate a socket pool update during execution of a procedure, for example, the procedure of FIG. 3, according to another exemplary embodiment of the present invention;

FIGS. 6A and 6B illustrate a socket pool update during execution of a procedure, for example the procedure of FIG. 5, according to another exemplary embodiment of the present invention;

FIGS. 8A and 8B illustrate a socket information update for a socket pool during execution of a procedure, for example the procedure of FIG. 7, according to another exemplary embodiment of the present invention;

FIGS. 10A and 10B illustrate a request data size adjustment during execution of a procedure, for example the procedure of FIG. 9, according to another exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
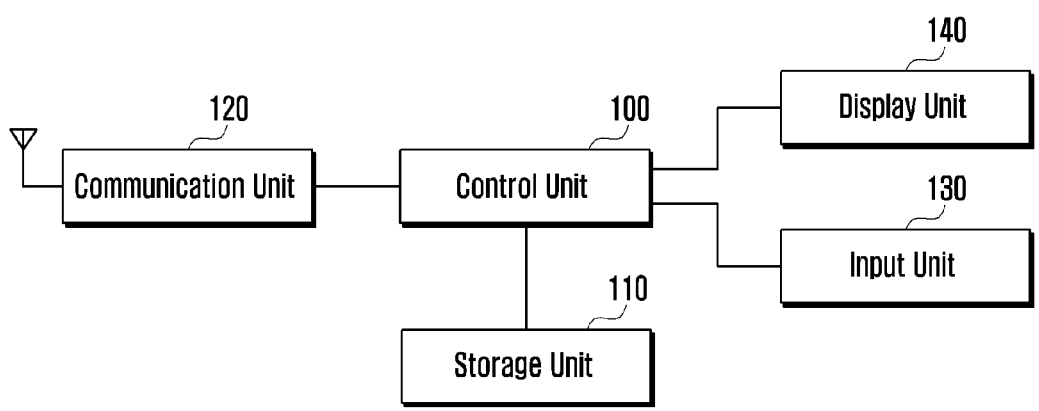
FIG. 1 is a block diagram of a terminal device (client device) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Particular terms (such as "last used tick", "timeout" and "remaining time") may be introduced to describe the invention without limiting the subject matter thereof.

As described before, HTTP is the primary protocol of data communication for the World Wide Web. Hence, optimization of the HTTP protocol stack in a terminal device (such as a mobile terminal or tablet computer) may directly affect user perception of webpage loading speed (or web surfing speed). In the description, loading may refer to uploading or downloading. Efficient operation of the HTTP protocol stack in the terminal device may require various enhancements in processing of server responses, management of server connectivity, and reduction of response time according to HTTP request patterns. Here, management of server connectivity is directly related with resources of the server and client, and speed of responses to requests. In the description, management of server connectivity refers to efficient management of persistent sockets in HTTP 1.1 or later. A persistent socket may be used to send and receive multiple HTTP requests/responses between a client and server, without opening a new socket for every request/response pair.

In one exemplary embodiment, a procedure is provided that finds a suitable persistent socket for sending an HTTP request. That is, the procedure for finding a suitable persistent socket is related with management of persistent socket options using HTTP response header information, management of persistent sockets using fields ("timeout", "max", "remaining time" and the like) in the "keep-alive" option of an HTTP header, and extension of alive time by reusing persistent sockets with respect to a given point in time.

In another exemplary embodiment, a procedure is provided that manages persistent sockets of the socket pool in a readily usable state. That is, the procedure for managing persistent sockets is related with removal of an invalid socket from the persistent socket pool according to a specific condition, reuse of a socket satisfying a specific condition through ping data to keep the socket alive, and continuous update of ping data for each socket destination by use of response data with the smallest size to reduce network load. Here, entries of ping data are associated with host addresses of persistent sockets and are maintained in a special database.

In another exemplary embodiment, a procedure is provided that effectively manages resources between the terminal device and server. That is, the procedure for effectively managing resources is related with maintaining a suitable number of persistent sockets, and maintaining m persistent sockets for maximum n hosts by use of a corresponding algorithm.

In the following description, a socket refers to a persistent socket.

FIG. 1 is a block diagram of a terminal device (client device) according to an exemplary embodiment of the present invention. In the description, the terminal device is assumed to be a mobile terminal. The terminal device may be a wired device or a wireless device.

Referring to the terminal device of FIG. 1, a communication unit 120 performs wireless communication with a base station or another device. The communication unit 120 may include a transmitter (not shown) for upconverting the frequency of a signal to be transmitted and amplifying the signal, and a receiver (not shown) for low-noise amplifying a received signal and downconverting the frequency of the received signal. The communication unit 120 may further include a modulator/demodulator (not shown), which modulates a signal to be transmitted and forwards the modulated signal to the transmitter, and demodulates a signal received through the receiver. Here, modulation and demodulation may be conducted according to LTE, WCDMA, GSM, Wi-Fi, WiBro, NFC, Bluetooth, or the like.

A control unit 100 controls the overall operation of the terminal device. In one exemplary embodiment, when an HTTP request is issued, the control unit 100 finds a suitable socket to send the HTTP request and updates the states of sockets in the socket pool accordingly. In another exemplary embodiment, when an HTTP response is received, the control unit 100 updates the states of sockets in the socket pool accordingly. In another exemplary embodiment, when a new socket is created, the control unit 100 maintains the total number of sockets and adjusts data sizes of the sockets so that resources between the terminal device and server are manageable.

A storage unit 110 may include a program section to store programs for operating the terminal device and implementing functions of the present invention, and a data section to store tables used for the terminal device and data generated in the course of using the terminal device. In particular, the storage unit 110 stores a pool of sockets used in the terminal device.

An input unit 130 may be a touch panel that senses a touch gesture of the user. A display unit 140 may be an LCD or OLED panel that displays data and images generated during program execution. Here, the input unit 130 and the display unit 140 may be combined as a touchscreen.

The storage unit 110 stores a pool of sockets used in the terminal device. The socket pool includes one or more sockets described by parameters given in Table 1.

TABLE 1

| Persistent socket No | Destination IP | Port No | Last used tick | Max | Timeout | Remaining time |
|---|---|---|---|---|---|---|

In Table 1, "last used tick" indicates the latest time at which the socket has been used. "Max" indicates the number of allowed uses of the socket, and "none" indicates no limit on the number of uses of the socket. "Timeout" indicates the time span allowed to use the socket, and expiration of "timeout" causes removal of the socket from the socket pool. "Remaining time" indicates the remaining time of the life of the socket. The value of "remaining time" decreases with the passage of time; and when the value thereof becomes zero (timeout), the socket is removed from the socket pool. Individual sockets of the socket pool are specified and managed by the above parameters (last used tick, max, timeout, and remaining time) stored in the storage unit 110.

When an HTTP request arises, the control unit 100 finds a proper persistent socket from the socket pool stored in the storage unit 110. An available socket is found according to "destination IP" and "port number". Thereafter, the control unit 100 updates socket parameters of the socket pool stored in the storage unit 110 to smoothly serve subsequent HTTP requests. In the update process, sockets in the socket pool satisfying preset conditions, are used in a round robin fashion to send dummy data, and socket parameters (such as "max" and "remaining time") corresponding to the "keep-alive" option field in an HTTP header, are updated.

When a response message is received from a server, the control unit 100 updates socket parameters of the socket pool stored in the storage unit 110 for efficient use of sockets. In this process, the control unit 100 may remove a socket satisfying a preset condition or keep a socket as a recently used socket by use of ping data. A ping data table is maintained to reduce network load; when the body or data size of the current response is smaller than that of a ping data entry in the ping data table, the HTTP request URL of the ping data entry is replaced with the URL used in the current response. The ping data table is continuously updated.

To efficiently manage resources between the terminal device and server, the control unit 100 keeps a fixed number of sockets in the socket pool. The control unit 100 updates ping data on the basis of a request corresponding to a response with the smallest data size among "keep-alive" responses. In addition, the control unit 100 may maintain a maximum of n*m persistent sockets (m sockets for n hosts) by use of a persistence maintenance algorithm (n and m may be experimentally determined through network modeling).

Figure 2:
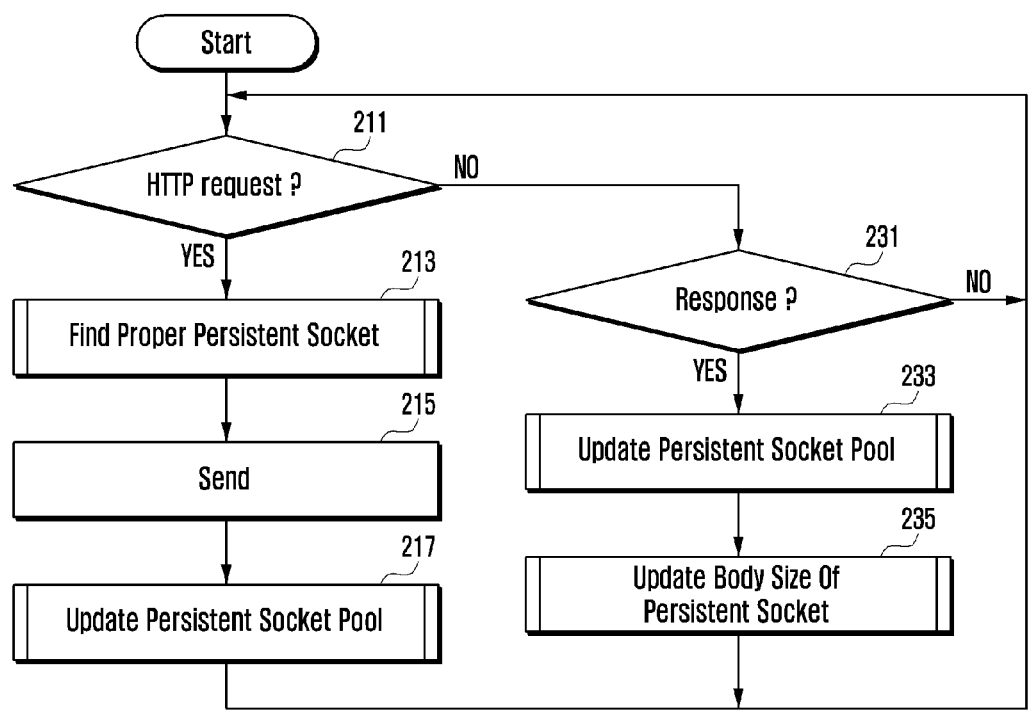
FIG. 2 is a flowchart of a method for handling HTTP requests and responses in a terminal device according to another exemplary embodiment of the present invention.

FIG. 2 is a flowchart of a method for handling HTTP requests and responses in a terminal device according to an exemplary embodiment of the present invention.

Referring to FIG. 2, the control unit 100 of the terminal device determines whether an HTTP request is issued at step 211. When an HTTP request is issued, the control unit 100 finds a proper socket from the socket pool at step 213. Here, a socket having the shortest remaining time may be selected from the socket pool. After a proper socket is found, the control unit 100 sends the HTTP request through the found socket to a given server at step 215, and updates parameters (such as "last used tick", "max" and "remaining time") of the socket.

Thereafter, the control unit 100 updates parameters of sockets in the socket pool stored in the storage unit 110 at step 217. Here, when the remaining time of a socket is within a preset range, the socket is used to send dummy data to the corresponding server (for example, a ping request is sent). This serves to increase the remaining time (usage time) of a socket whose remaining time is about to expire. When a normal response (for example, HTTP 200 OK) is received as a reply to the dummy data from the server, the control unit 100 updates parameters (such as "last used tick", "max" and "remaining time") of the socket. In the event that the remaining time of a socket is too small (i.e., less than the smallest value in the preset range), the control unit 100 may remove the socket from the socket pool.

When an HTTP request is not issued, the control unit 100 determines whether a response message is received from a server at step 231. When a response message is received from a server, the control unit 100 updates parameters (such as "last used tick", "max" and "remaining time") of a socket used for the response message in the socket pool at step 233. Here, the response message may be a reply from a server in return to transmission of an HTTP request or dummy data. When analysis of the response header in the response message indicates creation of a new socket, the control unit 100 may adjust the number of sockets so that a preset number of sockets is maintained for efficient management of resources between the terminal device and server. To create a new socket, the control unit 100 may remove a socket having the shortest remaining time (or the oldest socket) among existing sockets.

After update of parameters of the socket used to receive the response message, the control unit 100 identifies the data size of the response message and data sizes of the sockets in the socket pool, finds a socket whose data size is largest among the sockets of the socket pool, and, when the data size of the response message is smaller than that of the found socket, updates the data size of the found socket with the data size of the response message at step 235. That is, at step 235, the control unit 100 updates ping data by use of a request corresponding to a "keep alive" response with the least data size.

Next, the method for handling HTTP requests and responses illustrated in FIG. 2 is described in more detail.

Figure 3:
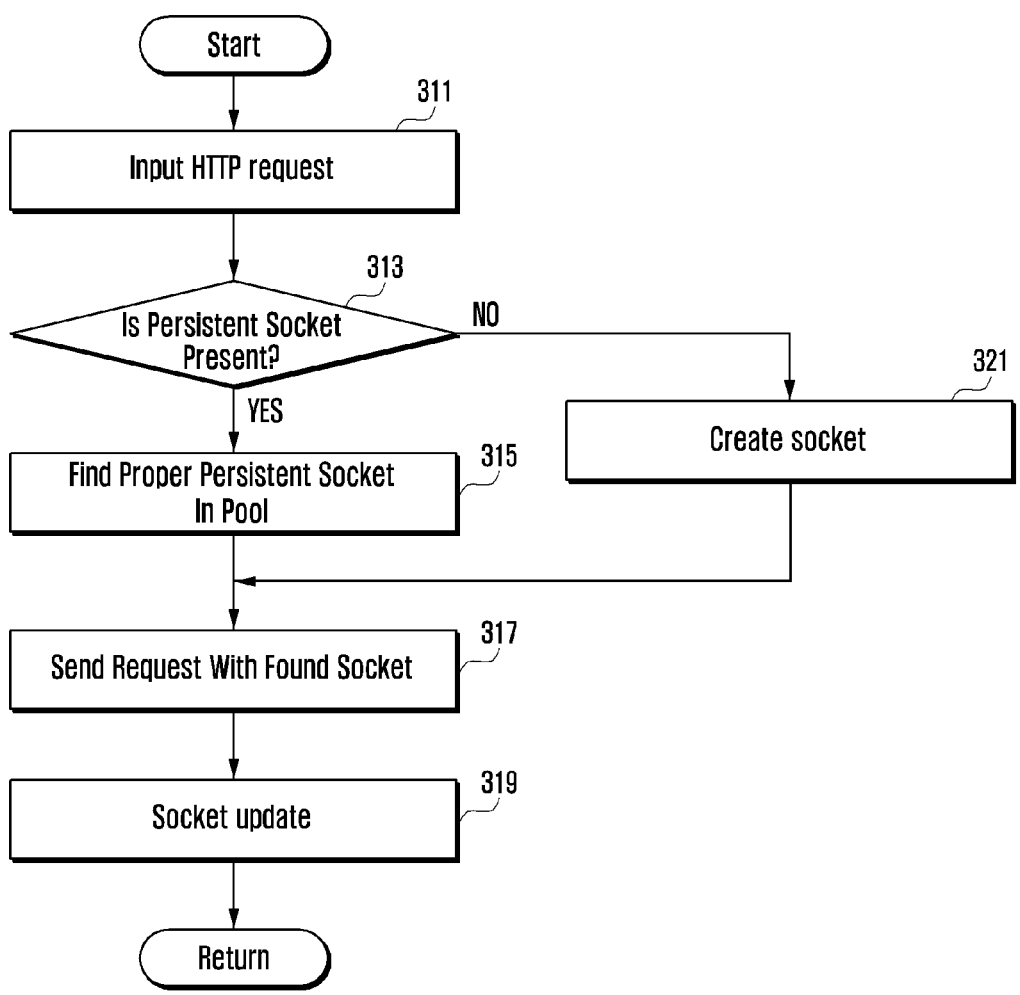
FIG. 3 is a flowchart of a procedure for finding a suitable socket to send an HTTP request according to another exemplary embodiment of the present invention.

FIG. 3 is a flowchart of a procedure for finding a suitable socket to send an HTTP request according to an exemplary embodiment of the present invention.

FIGS. 4A and 4B illustrate a socket pool update during execution of a procedure, for example the procedure of FIG. 3, according to an exemplary embodiment of the present invention.

Referring to FIGS. 3 to 4B, the control unit 100 detects occurrence of an HTTP request at step 311. Here, the HTTP request is assumed to have preconditions specified in Table 2.

TABLE 2

| precondition |
|---|
| HTTP request destination : 1,1,1,1:80 |
| current system tick : 20000 |

The control unit 100 determines whether persistent sockets are present in the socket pool in the storage unit 110 at step 313. When there is no socket (or no usable socket) in the socket pool, the control unit 100 creates a new socket at step 321. When there are sockets in the socket pool as illustrated in FIG. 4A, the control unit 100 searches the socket pool for a socket with destination IP (1,1,1,1) and port (80) at step 315. To find a suitable socket, the control unit 100 may refer to remaining times of sockets. The control unit 100 may select a socket having the shortest remaining time among sockets whose remaining times are greater than or equal to a threshold time. Here, the threshold time indicates a short duration after which the remaining time expires, and is assumed to be two seconds in the following description.

In FIG. 4A, persistent socket 1 may be selected as a suitable socket to send the HTTP request. That is, persistent socket 1 has a remaining time that is longer than the threshold time (2 seconds) and is the shortest among persistent sockets 1 to 6. After finding a suitable socket, the control unit 100 sends the HTTP request through the found socket to the server at step 317. When a response is received from the server, the control unit 100 updates parameters of the used socket (socket 1 in FIG. 4A) at step 319. FIG. 4B illustrates the socket pool updated after reception of a response in return to an HTTP request by use of socket 1. Here, for socket 1, "last used tick", "max", and "remaining time" are updated. "Last used tick" (latest system time at which the socket is used) is updated from 14000 to 20000 (current system tick in precondition). "Max" (the number of allowed uses, "none" for no limit) is updated from 5 to 4. "Remaining time" is updated from 3 seconds to 9 seconds (as "timeout" is set to 9). Here, the "timeout" value is determined by the server and is indicated by the "keep alive" attribute in the HTTP header. When the "keep alive" attribute is not contained in the HTTP header, the terminal device may use a default timeout value (for example, 10 seconds). In summary, FIG. 4B depicts the socket pool updated after reception of a sever response to an HTTP request by use of socket 1.

After processing an HTTP request, the control unit 100 updates sockets in the socket pool.

Figure 5:
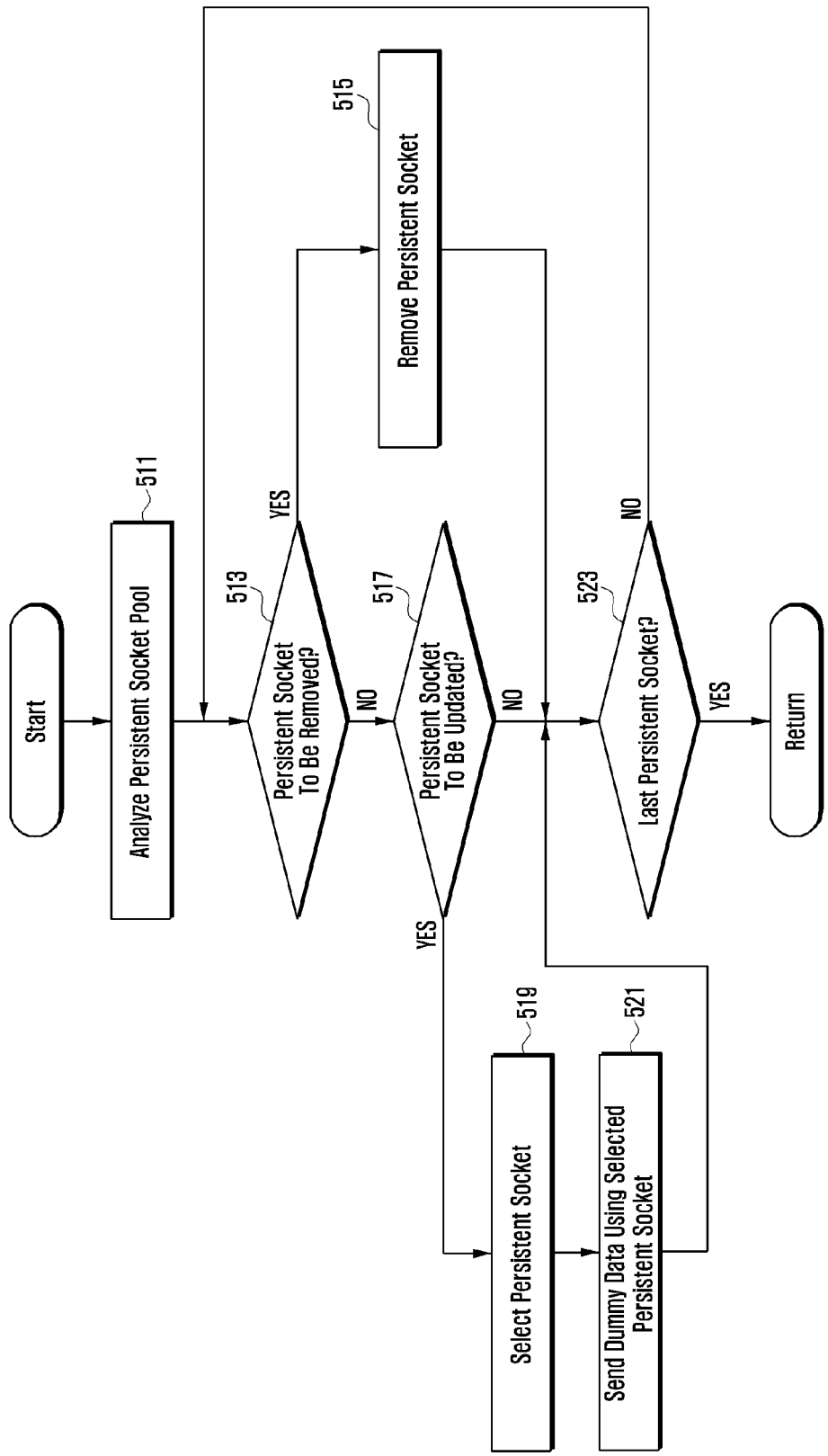
FIG. 5 is a flowchart of a procedure for socket pool optimization after processing an HTTP request according to another exemplary embodiment of the present invention.

FIG. 5 is a flowchart of a procedure for socket pool optimization after processing an HTTP request according to an exemplary embodiment of the present invention.

FIGS. 6A and 6B illustrate a socket pool update during execution of a procedure, for example the procedure of FIG. 5, according to another exemplary embodiment of the present invention.

Referring to FIGS. 5 to 6B, the control unit 100 analyzes sockets in the socket pool at step 511. Analysis is performed to identify a socket to be removed or a socket to be updated. Here, a socket whose remaining time is shorter than or equal to the threshold time may be removed. For a socket whose remaining time is within an update range, the remaining time thereof may be set to the "timeout" value. In the following description, it is assumed that the threshold time is 2 seconds and the update range is between the threshold time and half the "timeout" value.

The control unit 100 determines whether a socket to be removed is present in the socket pool at step 513. Here, as described above, a socket whose remaining time is shorter than or equal to the threshold time (2 seconds) is to be removed. In FIG. 6A, socket 1 may be a socket to be removed as the remaining time thereof is 2 seconds. When a socket to be removed is present in the socket pool, the control unit 100 removes the socket (here, socket 1) from the socket pool at step 515. The reason for removing a socket whose remaining time is shorter than or equal to the threshold time is that such a socket may be unusable owing to timeout (remaining time of 0) when a next HTTP request arises. In other words, the possibility of errors in using sockets may be reduced by removing a socket that is highly probable to timeout from the socket pool.

The control unit 100 determines whether a socket to be updated is present in the socket pool at step 517. A socket whose remaining time is within the update range may become a socket to be updated. In FIG. 6A, sockets 4, 5 and 6 may be sockets to be updated as remaining times thereof are between the threshold time (here, 2 seconds) and half the "timeout" value (here, ½ of 10 seconds). When a socket to be updated is present, the control unit 100 selects the socket to be updated (519). In FIG. 6A, one of sockets 4, 5 and 6 may be selected.

The control unit 100 sends dummy data (ping request) through the selected socket at step 521. Here, a ping request (not actual HTTP request) is sent to update the remaining time of the selected socket.

The control unit 100 determines whether all sockets in the socket pool are processed at step 523. When not all sockets are processed, the control unit 100 returns to step 513 and continues socket removal or update. When all sockets are processed, the control unit 100 ends the procedure.

Thereafter, when a response message is received in return to the ping request, parameters of the socket used to send the ping request are updated. In this case, the socket pool of FIG. 6A is updated as shown in FIG. 6B. Socket 1 is removed; and, for sockets 4, 5 and 6, "last used tick" and "remaining time" are updated.

When an HTTP request or ping request is sent, a response message is received from the corresponding server. The response from the server may entail a new socket.

Figure 7:
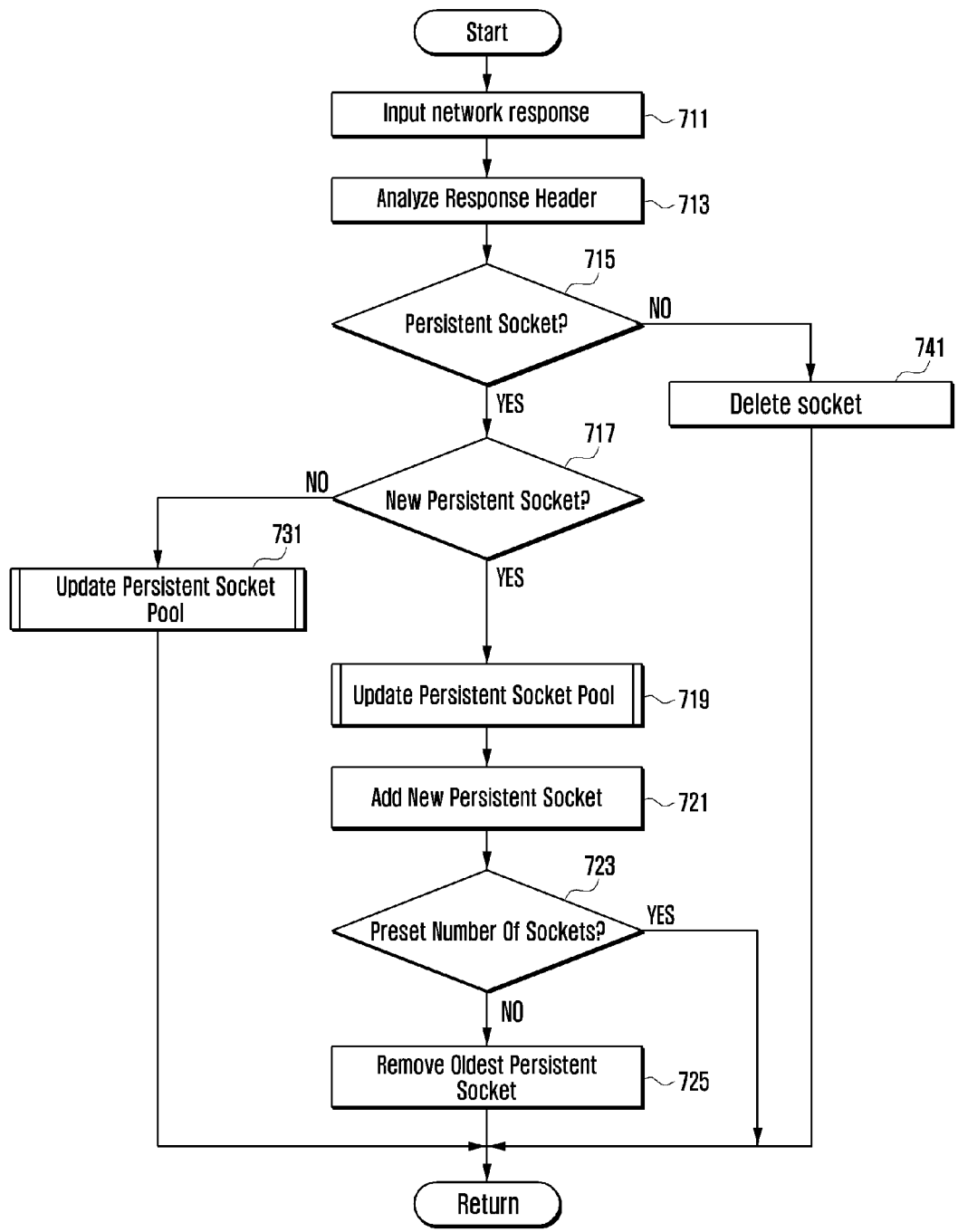
FIG. 7 is a flowchart of a procedure for socket pool update after reception of a response message from a server according to another exemplary embodiment of the present invention.

FIG. 7 is a flowchart of a procedure for socket pool update after reception of a response message from a server according to another exemplary embodiment of the present invention.

FIGS. 8A and 8B illustrate a socket information update for a socket pool during execution of a procedure, for example the procedure of FIG. 7, according to another exemplary embodiment of the present invention.

Referring to FIGS. 7 to 8B, the control unit 100 receives a response message from a server at step 711, and analyzes header information of the response message at step 713. Here, the response header may have a structure shown in Table 3.

TABLE 3

| precondition |
| --- |
| current system tick: 2000 |
| response header information |
|     connection: keep-alive |
|     keep alive: time out=6 |

A persistent socket is analyzed at step 715 and when the header information is not associated with the persistent socket (i.e., "connection" field is not set to "keep alive"), the control unit 100 closes the socket at step 741. When the header information is associated with a new persistent socket at step 717, the control unit 100 updates parameters of sockets in the socket pool at step 719, and adds the new socket to the socket pool in the storage unit 110 at step 721. Thereafter, the control unit 100 determines whether the number of sockets in the socket pool exceeds a preset limit at step 723. When the number of sockets exceeds the preset limit, the control unit 100 deletes a socket satisfying a given condition to maintain a preset number of sockets at step 725. For example, in the event that the socket pool is allowed to accommodate a maximum of five sockets and a new socket is added to the socket pool, a socket whose remaining time is shorter than or equal to the threshold time may be removed from the socket pool. When such a socket is not present, the earliest used socket (i.e., socket with the largest difference between "current system tick" and "last used tick") may be removed from the pool. In the above description, a socket belonging to an update range is used to send a ping request first and then a new socket is added to the socket pool. In another exemplary embodiment, a new socket may be added to the socket pool first and then parameters of sockets in the socket pool may be updated.

When the header information is not associated with a new persistent socket at step 717, the control unit 100 updates parameters of sockets in the socket pool at step 731.

When a response is received from a server, the control unit 100 performs socket pool update according to response header information. Here, socket pool update may be conducted by updating all sockets in the socket pool (first scheme) or by updating the socket corresponding to the response (second scheme).

In the first scheme, when a response associated with a new persistent socket is received from the server, the control unit 100 updates the socket pool by performing the procedure of FIG. 5 (a socket satisfying a removal condition is deleted and a socket satisfying an update condition is updated through a ping request and response) and adding the new socket to the socket pool. For example, in FIG. 8A, socket 3 is removed; and sockets 4 and 5 are used to send a ping request. When normal responses (HTTP 200 OK) are received from the server, sockets 4 and 5 are updated as shown in FIG. 8B. Additionally, socket 6 is newly added to the socket pool. In the second scheme, at step 731, parameters of a socket used to receive a normal response are updated; and a socket satisfying a removal condition is deleted and a socket satisfying an update condition is updated in a manner described above.

During socket pool update, when a server response is received, sockets in the socket pool may be deleted or updated. In another exemplary embodiment, when an HTTP request is made, sockets in the socket pool may be deleted or updated; and when a server response is received, only the socket used to receive the response may be updated. Here, in FIG. 7, step 719 may be skipped, and only the socket corresponding to the response may be updated. That is, the procedure of FIG. 7 handles socket pool update upon reception of a response to an HTTP request or ping request, and may also be used to update parameters of a socket corresponding only to a request.

The response header information contains body size information (content-length). Here, "body size" indicates the size of data carried by a ping request. A small body size means that the corresponding ping request carries a small amount of data. Hence, it is preferable to perform socket update on the basis of a URL associated with a smallest body size.

Figure 9:
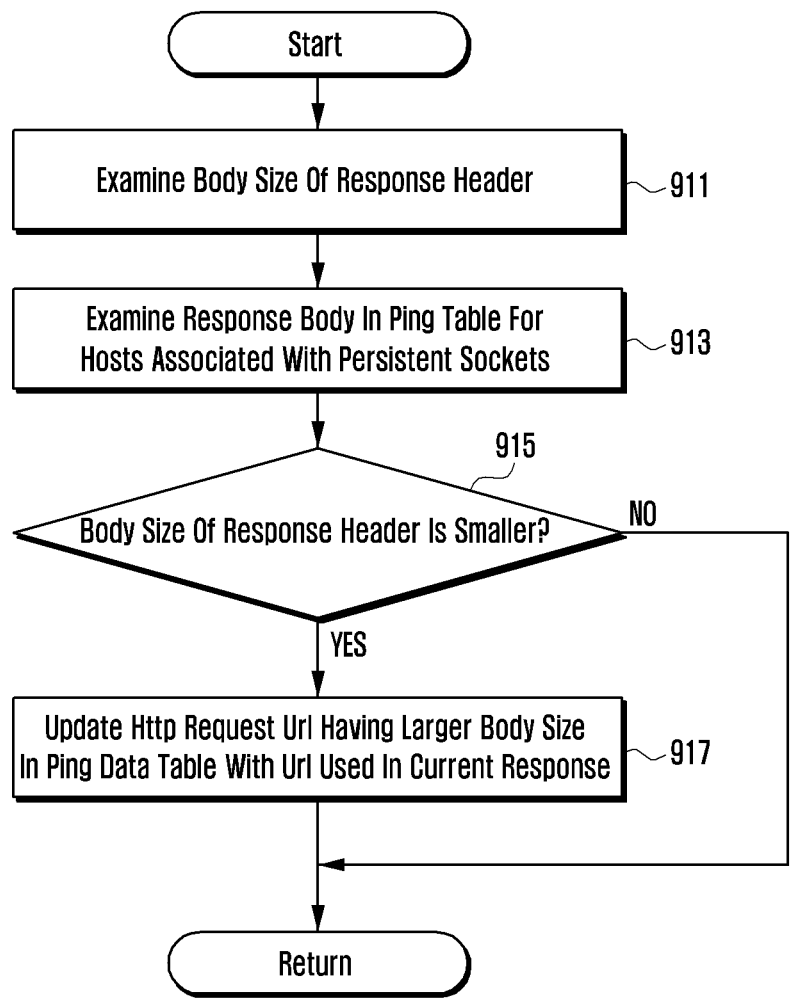
FIG. 9 is a flowchart of a procedure for request data size adjustment according to response header information according to another exemplary embodiment of the present invention.

FIG. 9 is a flowchart of a procedure for request data size adjustment according to response header information according to another exemplary embodiment of the present invention.

FIGS. 10A and 10B illustrate a request data size adjustment during execution of a procedure, for example the procedure of FIG. 9, according to another exemplary embodiment of the present invention.

Referring to FIGS. 9 to 10B, when a response is received from a server, the control unit 100 analyzes header information of the response at step 911. Response header information is illustrated in Table 4.

TABLE 4

| precondition |
| --- |
| response header information |
|    connection: keep-alive |
|    keep alive: time out=6 |
|    content-length: 120 |

Table 4 indicates that the size of request data to be sent through a socket is 120. The control unit 100 analyzes body sizes in a ping data table associated with sockets in the socket pool at step 913. FIG. 10A illustrates body sizes in a ping data table. The control unit 100 determines whether a body size in the ping data table is greater than the body size of the response header information at step 915. When a socket body size in the ping data table is greater than the body size of the response header information, the control unit 100 updates request data having a body size greater than the body size of the response header information with request data having caused the response at step 917.

For example, in FIG. 10A, the body size of response header information is 120. Through steps 915 and 917, HTTP request data having a body size of 360 is replaced with HTTP request data having a body size of 120 (body size of response header information) as shown in FIG. 10B.

As described above, a terminal device (client) communicating with a server performs socket pool update by removing and updating sockets with the same destination information in the socket pool when a request is made and/or a response is received. Hence, sockets in the socket pool can be kept in a stable state and be used to successfully process HTTP requests without error. Such socket management may enhance reusability of persistent sockets. The client may configure one socket pool for a destination IP group.

Figure 11:
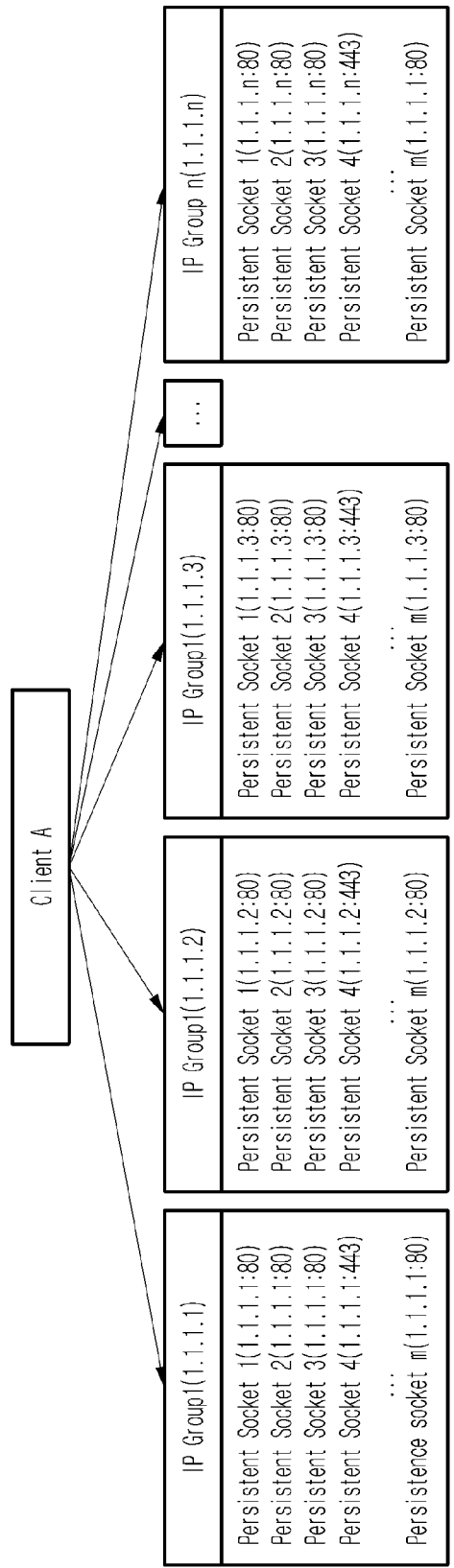
FIG. 11 illustrates a persistent socket pool architecture for a client according to an exemplary embodiment of the present invention.

FIG. 11 illustrates a persistent socket pool architecture for a client according to an exemplary embodiment of the present invention.

Referring to FIG. 11, when there are n destination IP groups, the client may independently configure one socket pool for each destination IP group. The client may manage sockets corresponding to one destination IP group by performing the procedures described in FIGS. 3, 5, 7 and 9 when a request is made and/or a response is received.

As described above, HTTP persistent sockets may be managed in a stable state. This contributes to reduction in page loading error rate and to enhancement in overall page loading speed. Table 5 indicates significant reduction of the page loading error rate (related art: 0.35%, exemplary embodiment: 0.07%, 5-fold improvement).

TABLE 5

| Test site (number of requests) | Trial | Loading error (related art) | Loading error (exemplary embodiment) |
| --- | --- | --- | --- |
| 547 | 1 | 5 | 2 |
|  | 2 | 3 | 1 |
|  | 3 | 3 | 0 |
|  | 4 | 4 | 1 |
|  | 5 | 1 | 0 |
| 380 | 1 | 1 | 0 |
|  | 2 | 2 | 0 |
|  | 3 | 0 | 0 |
|  | 4 | 1 | 1 |
|  | 5 | 2 | 0 |
| 276 | 1 | 0 | 0 |
|  | 2 | 1 | 0 |
|  | 3 | 0 | 0 |
|  | 4 | 1 | 0 |
|  | 5 | 1 | 0 |
| 318 | 1 | 1 | 0 |
|  | 2 | 0 | 0 |
|  | 3 | 0 | 0 |
|  | 4 | 1 | 0 |
|  | 5 | 2 | 0 |
| 300 | 1 | 1 | 0 |
|  | 2 | 1 | 0 |
|  | 3 | 0 | 0 |
|  | 4 | 0 | 0 |
|  | 5 | 1 | 1 |
| Average error (%) (all errors/num of all requests) |  | 0.35 | 0.07 |

Table 6 indicates average page loading speed in automatic page loading tests for 40 major sites. An improvement of about 11 percent is observed in page loading speed.

TABLE 6

| Performance automation summary | Related art | Exemplary Embodiment |
|---|---|---|
| 1st run avg | 17.00240541 | 15.05710811 |
| 2nd run avg | 15.33827027 | 15.38270027 |
| 3rd run avg | 16.68997297 | 14.52986486 |
| 4th run avg | 17.68653838 | 14.87653196 |
| 5th run avg | 16.34762169 | 14.31864296 |
| total avg | 16.62296174 | 14.83296963 |

In a feature of an exemplary embodiment, the method and apparatus for managing HTTP persistent sockets can reduce page loading errors and increase overall page loading speed. As a web page is composed of many HTTP requests, successful rendering of the web page requires orderly reception and processing of responses corresponding to requests. In this respect, the method and apparatus can contribute to accurate rendering of a web page by managing HTTP requests so that each HTTP request is successfully processed without error. Page loading speed is one of the most important factors in good user experience. The method and apparatus can increase page loading speed by enhancing reusability of persistent sockets.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A client device comprising:
a communication unit configured to communicate with a server;
a storage unit configured to store a socket pool containing at least one socket for each one of a plurality of destination IP groups; and
a control unit configured to:
select, when an HTTP request is issued, a socket in the socket pool,
send the HTTP request to the server through the selected socket,
when a response of the HTTP request is received from the server, update socket information of the selected socket in the socket pool, and
when a response of at least one ping request is received from a server, update socket information of at least one socket respective to the at least one ping request in the socket pool,
wherein the socket information comprises a "last used tick," parameter, a "remaining time" parameter, and a "max" parameter.

2. The client device of claim 1, wherein, when the HTTP request is issued, the control unit is configured to:
select the socket based on the shortest "remaining time" parameter from the socket pool, and
the control unit is configured to:
update the "last used tick" parameter of the selected socket with a "current system tick" parameter, and
update the "remaining time" parameter with the "timeout" parameter.

3. The client device of claim 2, wherein the control unit is configured to remove a socket whose "remaining time" parameter is shorter than or equal to a preset threshold time from the socket pool.

4. The client device of claim 3, wherein the control unit is configured to:
identify the socket whose "remaining time" parameter is within a preset update range in the socket pool,
send at least one ping request through the identified socket, and update, when the response of the at least one ping request is received from the server, the "last used tick" parameter of the identified socket with the "current system tick" parameter, and
update the "remaining time" parameter with the "timeout" parameter.

5. The client device of claim 4, wherein the preset update range is longer than the preset threshold time and is shorter than half of the "timeout" parameter.

6. The client device of claim 4, wherein the control unit, when a number of sockets in the socket pool exceeds a preset value, is configured to remove an earliest used socket from the socket pool.

7. The client device of claim 4, wherein, when the response is received from the server through the socket, the control unit is configured to:
examine response header information, and
update, when ping data size of the socket in the socket pool is larger than ping data size of the response header information, the ping data size of the socket with the ping data size of the response header information.

8. An HTTP socket control method for a client device, comprising:
selecting, when an HTTP request is issued, a socket in a socket pool containing at least one socket for each one of a plurality of destination IP groups;
sending the HTTP request to a server through the selected socket; and
when a response of the HTTP request is received from the server, update socket information of the selected socket in the socket pool, and
when a response of at least one ping request is received from a server, update socket information of at least one socket respective to the at least one ping request in the socket pool,
wherein the socket information comprises a "last used tick" parameter, a "remain time" parameter, and a "max" parameter.

9. The HTTP socket control method of claim 8,
wherein finding the socket comprises selecting a socket having the shortest "remaining time" parameter from the socket pool, and
wherein updating the socket information comprises updating, when the response of the HTTP request is received from the server, the "last used tick" parameter of the selected socket with the "current system tick" parameter and updating the "remaining time" parameter with the "timeout" parameter.

10. The HTTP socket control method of claim 9, further comprising removing, after sending the HTTP request, a socket whose "remaining time" parameter is shorter than or equal to a preset threshold time from the socket pool.

11. The HTTP socket control method of claim 9, further comprising:
identifying, after sending the HTTP request to the server, a socket whose "remaining time" parameter is within a preset update range in the socket pool and sending the at least one ping request through the identified socket; and
updating, when the response of the HTTP request is received from the server, the "last used tick" parameter of the identified socket with the "current system tick" parameter and updating the "remaining time" parameter with the "timeout" parameter.

12. The HTTP socket control method of claim 11, wherein the preset update range is longer than the a threshold time and is shorter than half of the "timeout" parameter.

13. The HTTP socket control method of claim 9, further comprising:
   examining, when the response of the HTTP request is received from the server, response header information; and
   adding, when socket addition is indicated, a new socket to the socket pool.

14. The HTTP socket control method of claim 13, further comprising removing, when a number of sockets in the socket pool exceeds a preset value after addition of the new socket to the socket pool, an earliest used socket from the socket pool.

15. The HTTP socket control method of claim 14, further comprising:
   identifying, after addition of the new socket to the socket pool, a socket whose "remaining time" parameter is within an update range in the socket pool and sending the at least one ping request through the identified socket; and
   updating, when the response of the at least one ping request is received from the server, the "last used tick" parameter of the identified socket with the "current system tick" parameter and updating the "remaining time" parameter with the "timeout" parameter.

16. The HTTP socket control method of claim 9, further comprising:
   examining, when the response for the HTTP request is received from the server through the selected socket, response header information; and
   updating, when ping data size of the selected socket in the socket pool is larger than ping data size of the response header information, the ping data size of the selected socket with the ping data size of the response header information.

* * * * *